(12) United States Patent
Aksela et al.

(10) Patent No.: US 10,652,762 B2
(45) Date of Patent: May 12, 2020

(54) ENHANCED QUALITY OF SERVICE OF A CELLULAR RADIO ACCESS NETWORK

(71) Applicant: COMPTEL CORPORATION, Helsinki (FI)

(72) Inventors: Matti Aksela, Helsinki (FI); Markus Ojala, Helsinki (FI); Mikko Jarva, Helsinki (FI); Timo Similä, Helsinki (FI); Jaakko Virtanen, Helsinki (FI)

(73) Assignee: Comptel Corporation, Helsinki (FI)

( * ) Notice: Subject to any disclaimer, the term of this patent is extended or adjusted under 35 U.S.C. 154(b) by 0 days.

(21) Appl. No.: 15/541,197

(22) PCT Filed: Dec. 28, 2015

(86) PCT No.: PCT/FI2015/050947
§ 371 (c)(1),
(2) Date: Jun. 30, 2017

(87) PCT Pub. No.: WO2016/107982
PCT Pub. Date: Jul. 7, 2016

(65) Prior Publication Data
US 2017/0353873 A1    Dec. 7, 2017

(30) Foreign Application Priority Data

Dec. 30, 2014    (EP) .................................... 14200585

(51) Int. Cl.
*H04W 24/02* (2009.01)
*H04W 24/04* (2009.01)
(Continued)

(52) U.S. Cl.
CPC ........ *H04W 24/02* (2013.01); *H04B 7/18506* (2013.01); *H04L 41/0631* (2013.01);
(Continued)

(58) Field of Classification Search
None
See application file for complete search history.

(56) References Cited

U.S. PATENT DOCUMENTS

| | | | |
|---|---|---|---|
| 6,446,123 B1 | 9/2002 | Ballantine et al. | |
| 7,263,636 B1 | 8/2007 | Buller et al. | |

(Continued)

FOREIGN PATENT DOCUMENTS

| | | | |
|---|---|---|---|
| CN | 103236948 A | 8/2013 | |
| GB | 2476999 A | 7/2011 | |

(Continued)

OTHER PUBLICATIONS

European Patent Office, European Search Report issued in appln. No. 14200585.9 dated May 15, 2015.

(Continued)

*Primary Examiner* — Yemane Mesfin
*Assistant Examiner* — Jeff Banthrongsack

(57) ABSTRACT

Enhanced quality of service of a cellular radio access network is provided by monitoring the operation of the network for predicting failures. For each of the predicted failures, a proactive maintenance plan is created and an alternative network configuration determined, in which alternative network configuration the impact of the planned maintenance operations is less than in the current (non-alternative) network configuration. Additionally, timing of the maintenance operations is decided based on a network traffic estimate and the network is automatically reconfigured into the alternative network configuration prior to the selected maintenance operation time. According to an embodiment, the object is achieved by means of a Pre-emptive Maintenance Node (PEM) connected to the telecommunications network, such as to an LTE or LTE-A network.

15 Claims, 3 Drawing Sheets

(51) Int. Cl.
*H04L 12/24* (2006.01)
*H04B 7/185* (2006.01)

(52) U.S. Cl.
CPC .......... *H04L 41/0816* (2013.01); *H04L 41/12* (2013.01); *H04L 41/147* (2013.01); *H04W 24/04* (2013.01)

(56) References Cited

U.S. PATENT DOCUMENTS

| | | | |
|---|---|---|---|
| 8,102,761 | B2 | 1/2012 | Yamaguchi et al. |
| 8,856,584 | B2 * | 10/2014 | Matsubara ............... H04L 45/22 370/217 |
| 2007/0222576 | A1 | 9/2007 | Miller et al. |
| 2008/0064361 | A1 | 3/2008 | Bjork et al. |
| 2010/0278038 | A1 | 11/2010 | Stahle et al. |
| 2011/0053530 | A1 | 3/2011 | Kenington et al. |
| 2011/0161740 | A1 | 6/2011 | Sonoda et al. |
| 2012/0295611 | A1 | 11/2012 | Amirijoo et al. |
| 2013/0053024 | A1 | 2/2013 | Zou et al. |
| 2013/0244644 | A1 | 9/2013 | Amirijoo et al. |
| 2014/0099942 | A1 | 4/2014 | Kim et al. |
| 2014/0177430 | A1 * | 6/2014 | Hassett ............... H04L 41/0609 370/216 |
| 2014/0211605 | A1 | 7/2014 | Zhang et al. |
| 2014/0295856 | A1 * | 10/2014 | Chou ..................... H04W 28/24 455/446 |
| 2014/0357259 | A1 * | 12/2014 | Tomeczko ............ H04W 24/04 455/423 |
| 2015/0195192 | A1 | 7/2015 | Vasseur et al. |

FOREIGN PATENT DOCUMENTS

| | | |
|---|---|---|
| JP | 2000197105 A | 7/2000 |
| JP | 2002044011 A | 2/2002 |
| JP | 2011181988 A | 9/2011 |
| WO | 0117169 A2 | 3/2001 |
| WO | 2010061573 A1 | 6/2010 |
| WO | 2011081583 A1 | 7/2011 |
| WO | 2012143059 A1 | 10/2012 |

OTHER PUBLICATIONS

International Telecommunication Union: "Principles for a telecommunications management network", Series M: TMN and Network Maintenance: International Transmission Systems, Telephone Circuits, Telegraphy, Facsimile and Leased Circuits, Feb. 1, 2000, XP002739640.

European Patent Office, Communication pursuant to Article 94(3) EPC issued in appln. No. 14200858.9 dated Jun. 8, 2017.

* cited by examiner

ENHANCED QUALITY OF SERVICE OF A CELLULAR RADIO ACCESS NETWORK

PRIORITY

This application is a U.S national application of PCT-application PCT/FI12015/050947 filed on Dec. 28, 2015 and claiming priority of European application EP 14200585.9 filed on Dec. 30, 2014, the contents of all of which are to incorporated herein by reference.

TECHNICAL FIELD

The present invention relates to cellular radio access networks.

More particularly, the invention relates to methods and systems for enhancing quality of service (QoS) in cellular radio access networks, such as long term evolution (LTE) networks, universal mobile telecommunications system (UMTS) radio access networks (UTRAN or E-UTRAN), long term evolution advanced (LTE-A) networks, global system for mobile communication (GSM) networks, and wideband code division multiple access (WCDMA) networks.

BACKGROUND ART

Configuration of a telecommunications management network is disclosed in ITU-T Recommendation M.3010 "Principles for a telecommunications management network" in SERIES M: TMN AND NETWORK MAINTENANCE: INTERNATIONAL TRANSMISSION SYSTEMS, TELEPHONE CIRCUITS, TELEGRAPHY, FACSIMILE AND LEASED CIRCUITS.

Handbook of data mining and knowledge discovery, Pages 891-896, Oxford University Press, Inc. New York, N.Y., USA 2002, ISBN: 0-19-511831-6, discusses different methods for predicting telecommunication equipment failures from sequences of network alarms.

US 2007/0222576 A1 discloses a method for dynamically prioritizing network conditions for a communication system. The received alarm conditions are classified and rated.

WO 2012/143059 A1 discloses a method of recovery from multiple faults in a communications network. The method comprises analyzing received alarms to identify a possible root cause of the alarm signal and providing a root cause metric indicative of a difficulty of repairing the respective fault. The method also comprises determining a service impact caused to the communications network by the respective fault and ranking the alarm signals on the basis of the alarm metrics.

Methods and systems for cell outage management have been disclosed in US 2014/0357259 A1, US 2010/278038 A1, US 2008/064361 A1, US 2014/0295856 A1, US 2014/0211605 A1, US 2014/0099942 A1, US 2013/0244644 A1, US 20130053024 A1 and US 20120295611 A1.

DISCLOSURE OF INVENTION

It is an object of the present invention to enhance a quality of service (QoS) of a cellular radio access network.

The object of the invention is achieved by monitoring the operation of the network for predicting failures. For each of the predicted failures, a proactive maintenance plan is created and an alternative network configuration determined, in which alternative network configuration the impact of the planned maintenance operations is less than in the current (non-alternative) network configuration. Additionally, timing of the maintenance operations is decided based on a network traffic estimate and the network is automatically reconfigured into the alternative network configuration prior to the selected maintenance operation time.

By means of the invention, the overall quality of service of a cellular radio access network can be enhanced. This is because the number of network break down and cell outage situations can be lowered. At the same time, also the impact of the required recovery and maintenance operations to the quality of service can be lower.

According to an embodiment, the object is achieved by means of a Pre-emptive Maintenance Node (PEM) connected to the telecommunications network, such as to an LTE or LTE-A network.

The inventive concept allows also several useful and advantageous embodiments, which provide further advantages.

Pre-emptive maintenance allows preventing network failures or performance issues and thus prevents direct revenue loss and customer experience impact.

Pre-emptive maintenance allows preventing field work and costly field maintenance operations.

According to embodiments, alarms and falls alarms from the network elements are handled automatically, which is efficient and fast and provides for better QoS in the network.

BRIEF DESCRIPTION OF DRAWINGS

For a more complete understanding of the present invention and the advantages thereof, the invention is now described with the aid of the examples and with reference to the following drawings, in which.

MODES FOR CARRYING OUT THE INVENTION

All of the earlier mentioned standards, handbooks, patent applications and other publications are incorporated herein by reference.

Figure 1:
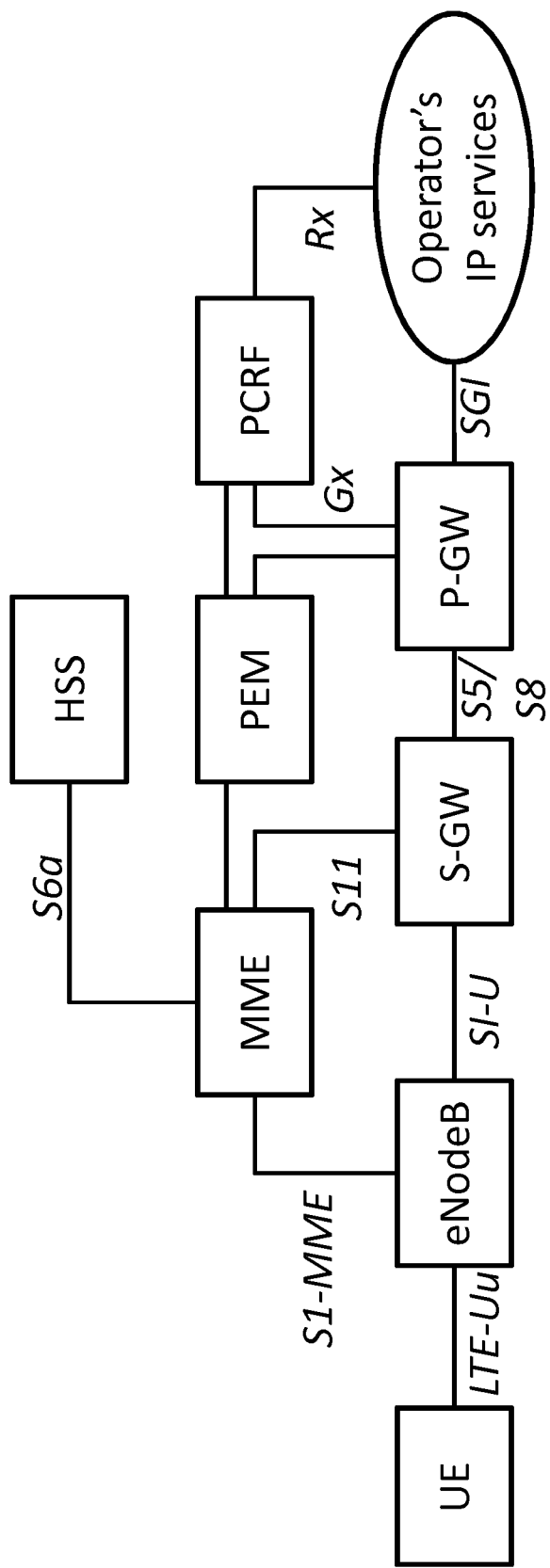
FIG. 1 presents a network environment according to an embodiment.

FIG. 1 shows a configuration of a Long Term Evolution (LTE) network in an embodiment of the invention.

The core network (CN), which is called the Evolved Packet Core (EPC) network in the System Architecture Evolution SAE, is responsible for the overall control of the user equipment (UE) and establishment of the bearers. The main logical nodes of the EPC are:

Packet Data Network (PDN) Gateway (P-GW)
Serving Gateway (S-GW)
Mobility Management Entity (MME)
Pre-emptive Maintenance Node (PEM)

In addition to these main logical nodes, EPC also includes other logical nodes and functions such as the Home Subscriber Server (HSS) and the Policy Control and Charging Rules Function (PCRF). Since the EPS only provides a bearer path of a certain QoS, control of multimedia applications such as VoIP is provided by the Internet Protocol (IP) Multimedia Subsystem (IMS), which is considered to be outside the EPS itself.

The logical core network nodes are shown in FIG. 1 and discussed in more detail below:

The Policy Control and Charging Rules Function (PCRF) is responsible for policy control decision-making, as well as for controlling the flow-based charging functionalities in the Policy Control Enforcement Function (PCEF), which resides in the P-GW. The PCRF provides the QoS authorization that decides how a certain data flow will be treated in the PCEF and ensures that this is in accordance with the user's subscription profile.

The Home Subscriber Server (HSS) contains users' SAE subscription data such as the EPS-subscribed QoS profile and any access restrictions for roaming. It also holds information about the PDNs to which the user can connect. This could be in the form of an access point name (APN) or a PDN address. In addition, the HSS holds dynamic information such as the identity of the Mobility Management Entity (MME) to which the user is currently attached or registered.

P-GW is responsible for IP address allocation for the UE, as well as QoS enforcement and flow-based charging according to rules from the PCRF. It is responsible for the filtering of downlink user IP packets into the different QoS-based bearers. This is performed based on Traffic Flow Templates (TFTs). The P-GW performs QoS enforcement for guaranteed bit rate (GBR) bearers. It also serves as the mobility anchor for interworking with non-3GPP technologies.

S-GW is a node through which all user IP packets are transferred. S-GW serves as the local mobility anchor for the data bearers when the UE moves between eNodeBs (also called as eNBs, both meaning Evolved Node B), which are the hardware elements that are connected to the mobile phone network communicate directly with mobile handsets (UEs). eNodeBs correspond to base transceiver stations (BTSs) in GSM networks.

MME is the control node that processes the signalling between the UE and the CN.

PEM monitors alarm messages received from Network Elements (NE) and performs pre-emptive maintenance as more thoroughly discussed later in the present publication.

In particular, PEM monitors alarm messages received from eNodeBs. For performing its tasks, PEM communicates in particular with P-GW and also with MME and PCRF. PEM can communicate also with elements outside of the core network, such as with the Network Operations Center (NOC) or Operations Support System/Business Support System (OSS/BSS).

The object of the operation of PEM is to identify the Network Elements (NEs) that are going to cause a critical alarm. NEs are intended to be identified before the critical issues occur. PEM also performs root cause analysis and insights on root cause analysis guide when resolving the issues.

Network management systems are complex with e.g. 100 000 network elements that have to be monitored and controlled in the Network Operations Center (NOC). In an embodiment, the network elements represent more than 35 technologies generating more than 5 million alarm notifications per day.

Embodiments provide accurate predictive scores on the critical network failures for pro-actively handling network issues before a breakdown occurs. This is carried out by means of PEM node. Operational target is to flag those NE's that will cause a critical alarm (and consequently fail) during for example two distinct prediction time windows based on weak signals from the alarm data. In an embodiment, PEM determines a propensity that the NE will cause one or more Critical Alarms for the network within the upcoming 1 week and a propensity that the NE will cause one or more Critical Alarms for the network within the upcoming 1 day or 24 hours.

Key word analysis of the root cause gives an indication for proactively resolving what might be a root cause for severe failures in the network.

Network failure incidents (e.g. radio network) are fairly common, affecting the customer experience, but can also be reasonably well predicted. Most network failures can be prevented by early remote reboot of the equipment. The UEs connected to any part of the affected network can be determined from the data.

Reboots or similar actions can be orchestrated and automated in fulfillment solution.

Choosing the right time to do the reboot, so that there will be minimal hit on revenue/customer experience can bring clear benefits for the network operator.

In an embodiment, automated predictive analytics process, utilizing service assurance data (alarm logs, event logs, performance counters), identifies patterns of past failures in the data and utilizes those patterns to predict future failures in the network. The process could be specifically applied for the radio network and even more specifically for RNC (radio network controller) elements, where failures are fairly common and affect customer experience in the connected sites.

In addition to ranking the network elements based on future failure likelihood score, the predictive analytics process according to an embodiment can provide best next action recommendation for the failure remedy. This can be done by solving the issue in advance by remote reboot procedure, for instance. It is also possible to conduct a site visit or further manual inspection if solving the issue requires.

In an embodiment, the analytics process allocates network revenue to specific locations (according to network topology) and time slots in order to determine the optimal maintenance window for failure remedy—i.e. the one that has the least negative impact on the overall network traffic and thus on the revenue—for each network element.

Based on the above measures, the analytics process according to an embodiment will output a shortlist of network elements with high failure likelihood, and provide the action recommendation and respective maintenance window for each action. The shortlist of network elements can be constructed for example such that it includes top X % of the network elements ranked by highest failure likelihood or all the network elements having their failure likelihoods above a threshold value.

Service fulfillment/activation process processes the shortlist. In an embodiment, this can include managing automatic remote reboot of the specific element based on the shortlist through remote CLI (command line interface) command or RPC (remote procedure call) through an API, for instance. This can also include that the process provides list of elements and respective maintenance windows to workforce system/ticketing systems. It is also possible that the solution collects data of the network behavior following the remedial action in order to provide further evidence that is used for the process of machine learning (re-fitting of predictive models).

In an embodiment, it is also possible to reroute some of the traffic to reduce the load in certain Network equipment for delaying the needed reboot. It is also possible to make reroute plan to minimize the impact on User experience due to a component reboot.

In an embodiment, additional information is collected and possible effects analyzed (predict a failure possibility) for nearby/affected network elements that the reboot could cause.

There are also other things besides reboot that can be done according to embodiments. For example, it is possible to optimize a component/part of network based on the analysis. It is also possible to find out positions where the failures might not come from that much from the condition of components but the overloading of the component and figure out where additional resources would help the most.

According to an embodiment, feed from network elements (error reports, environment data from Network Element location, etc) is constantly followed and the data analyzed in real time. From the feed, the process estimates a component that is going to have problems in near future. Additionally, the process can analyze the type of the problem and figure out what is the correct action to fix it. Possible actions include remote or local actions, such as reboot, configuration change and remote site visit. The process can also estimate how much time the operator has to do preventive actions to fix the issue in planned manner so that the network element does not "break" uncontrollably.

According to embodiments, variable prediction objectives include:
Predict critical alarms of IP routers
Predict trouble tickets generated by broadband subscriptions
Predict which alarms are false alarms
Predict which alarms require maintenance work
Predict critical alarms generated by base station controllers
Predict RNC board restarts
Predict which sites are generating service impacting critical alarms According to embodiments, variable source data includes but is not limited to:
Cisco routers alarms data from HP OpenView
Broadband CPE, DSL router and PE router data (event, alarm, syslog, trouble ticket) from EMC Smarts
Ericsson BSC & BTS alarm data from element management systems
Nokia BSC & BTS alarm data from NetAct network management systems
Ericsson RNC & Node B alarm & event data from element management systems
Weather data from regional meteorological institute
Environment data from Network Element location According to embodiments, the process provides unique insights findings, including:
Weather patterns impact radio network equipment, even those which are situated in climate controlled data centers
Earthquakes can be seen in alarm data
Maintenance operations form weekly and annual patterns, can be seen in the data and can be predicted
Specific regions, locations, element types and elements increase the likelihood of future failures
Previous component restarts reduce the likelihood of future failures
Previous component failures increase the likelihood of future failures
Various hidden signals mined from textual data that either increase or reduce the likelihood of future failures.

Key benefits of anticipatory knowledge provided by embodiments include:
Enhancing the overall quality of service
Replace urgent, expensive site visits with planned corrective maintenance
Optimise workforce expenses and improve working conditions
Optimise spare part logistics
Target areas with several expected failures at once
Prioritize key network nodes and services
Correlate predictions with impact on customer experience
Reduce the need for urgent site visits
Cut revenue loss caused by downtime
Avoid SLA penalties and improve customer loyalty According to embodiments, the corrective measures can also include automated reconfiguring of the network to compensate for the foreseen cell outage.

Methods and systems for cell outage management have been disclosed in US 2014/0357259 A1, US 2010/278038 A1, US 2008/064361 A1, US 2014/0295856 A1, US 2014/0211605 A1, US 2014/0099942 A1, US 2013/0244644 A1, US 20130053024 A1 and US 20120295611 A1. These methods detect a signal indicating that there is a cell outage. The methods automatically react to the situation for example by adjusting transmission power and/or an antenna tilt of at least one neighboring base station.

In the embodiments of the invention, an artificial cell outage indication can be given to the outage management system before the planned maintenance operation so that the network will automatically adapt to the becoming cell outage due to maintenance already before the maintenance. In this embodiment, the artificial cell outage indication will be of course given with regard to the network element affected by the planned maintenance operation. In such embodiments, the network emulates a cell outage situation before any actual cell outage occurs and thus can provide better quality of service and bandwidth for the cellular terminals.

When planning the maintenance time, an alternative network configuration for the alternative network topology map can be determined using the knowledge of the used cell outage management scheme. The, the system can determining the maintenance time based on the network traffic estimate and the alternative network configuration given by the cell outage management scheme.

The cell outage management scheme can also include temporarily decreasing channel bandwidth by reconfiguration. The adapted bandwidth can be transmission bandwidth and/or reception bandwidth.

The transmission bandwidth can be adapted in such a way that during a cell outage, the channel bandwidth of selected cells is decreased automatically and adaptively to increase the coverage of the selected cells and to compensate the coverage hole in the network. The services can also be transferred from the cell under maintenance to neighboring cells, for example, by using a forced handover between cells.

The cell outage management scheme can also include antenna tilting and/or transmission power adaptation either alone or together with other management schemes.

In an embodiment and in a first example, Social Links (SL) analytics software is constantly monitoring the network operations in real time through PEM. SL can take into account NE logs, NE alerts and NE monitoring data as well as weather data, traffic data, traffic estimates, NE physical environment data, such as temperature and/or moisture, NE maintenance data, NE configuration, NE software version, NE location in the network, network topology etc.

In the first example, SL estimates at that a certain node is giving out indications that it is going to fail in the near future. SL analyses the most likely failure and estimates that a simple remote reboot will fix it. SL sends the information forward to network control element that reboots the component.

In a second example, SL is constantly monitoring the network operations in real time through other feed. SL estimates that a certain node is giving out indications that it is going to fail in the near future. SL analyses the most likely failure and estimates that a simple remote reboot will fix it. SL estimates how long we have time to do a controlled reboot before the component will fail uncontrollably. SL estimates what the reboot would do to the QoS. SL estimates what is the optimal time to do the reboot so that it will happen before the component fails and still minimise the effect on QoS. SL schedules the reboot and instructs the network control element so it can do the reboot when scheduled.

In a third example, SL is constantly monitoring the network operations in real time through other feed, including maintenance data from maintenance history. SL estimates that a certain node is giving out indications that it is going to fail in the near future. SL analyses the most likely failure and estimates that it will require site visit. SL estimates how long we have time before the component will fail uncontrollably. It also estimates what is the real problem and what kind of actions it requires. Based on that information the maintenance can also figure out what spare parts/what system upgrades they have to make during the maintenance. SL estimates what the site visit and the required maintenance operations would do to the QoS. SL combines the last two with the work order schedule and estimates the best possible maintenance window with least cost and affect to the network traffic.

In a fourth example, SL is constantly monitoring the network operations in real time through reports from Network Elements. SL estimates that a certain node is giving out indications that it is going to fail in the near future. SL analyses the most likely failure and estimates that it will require a site visit. SL estimates how long we have time before the component will fail uncontrollably. It also estimates what is the real problem and what kind of actions it requires. Based on that information the maintenance can also figure out what spare parts/what system upgrades they have to make. SL combines this information with network topology information gathered from an Inventory program, for instance, and estimates the effect of the required maintenance on the network in larger scale. It can also analyse how the effect on network capabilities can be minimised through reconfiguring the network and/or rerouting traffic/services. SL estimates what the site visit and the maintenance would do the QoS. SL combines the last three with the work order schedule and estimates the best possible maintenance window with least cost and affect to the network traffic. SL instructs to reschedule the work order schedule, and informs the required replacement/upgrade parts for maintenance order. SL also schedules automatic network configurations/rerouting simultaneous to the maintenance visit to minimise the effect on QoS.

In a further example, rerouting/reconfiguring can be used also as a separate action. This can involve site visits.

In an embodiment, rerouting/reconfiguring can be used also as an emergency measure in case of an unexpected component failure to minimize the effects on QoS.

Examples of possible failures include alarms that, when analysed properly, show that the root cause of the issue is actually that a power source cannot feed the NE enough power. This lack in power supply causes the problems. A simple power replacement will fix these problems but if the power is not replaced fast it can break the components as well. Also without proper analytics it can be impossible to tell what the situation is. The operator might end up fixing the components several times before realising that the true problem is the lack of sufficient power.

Examples of failures also include temperature dependent and moisture dependent issues that can be cured by a corresponding investment on the environmental system around respective NEs. Sometimes, also impurities in the air cause problems, which can be fixed by replacement of an air filter, for instance.

Figure 2:
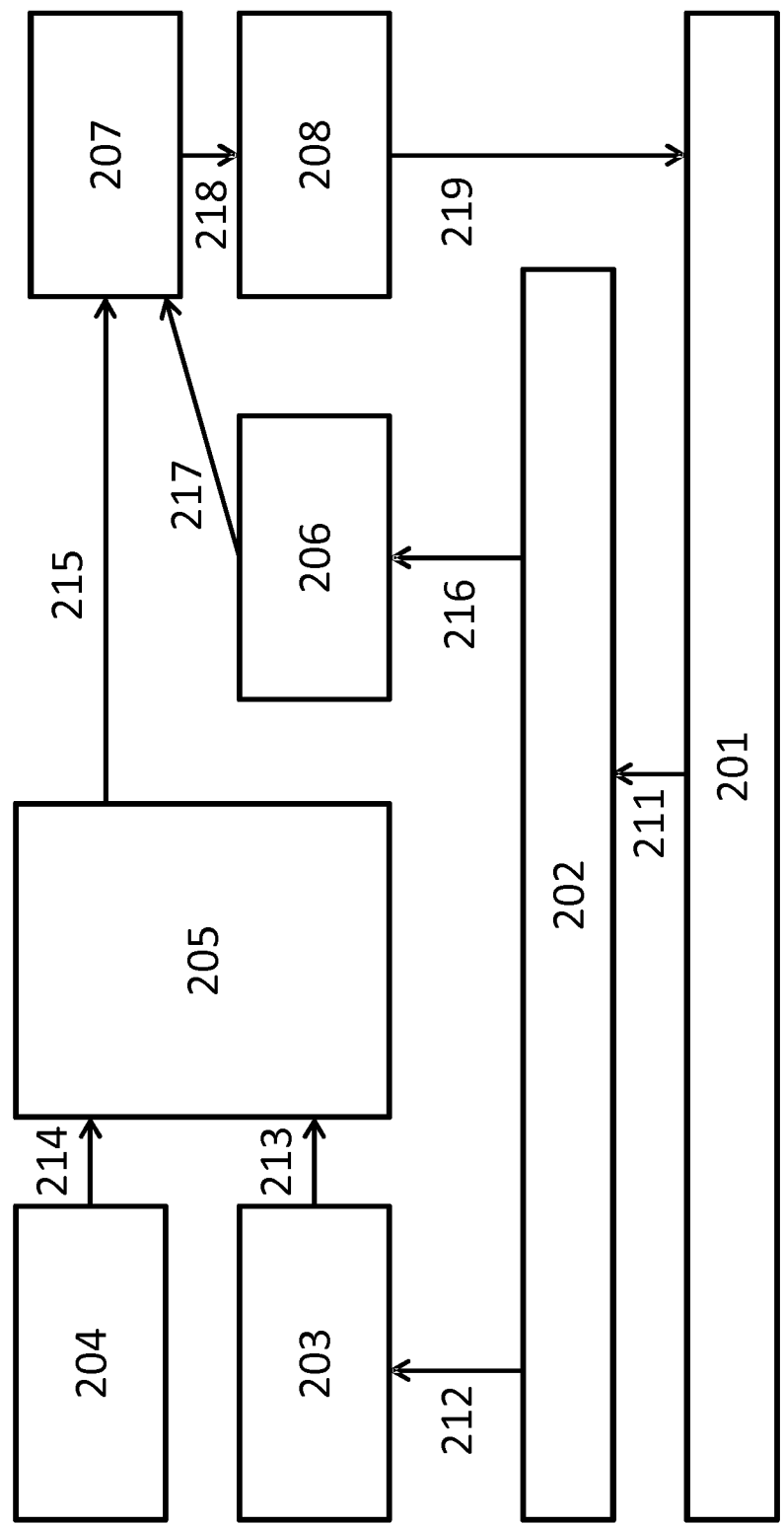
FIG. 2 presents a process diagram according to an embodiment.

FIG. 2 shows an overview of a process according to an embodiment. According to FIG. 2, network elements 201 send 211 raw data to a critical alarm prediction process 202, which uses data mining and estimation algorithms to obtain relevant data from the large dataset sent 211 from the network elements 201. Process 202 sends 212 relevant data to a network element level results process 203, which produces propensity scores and insights for the relevant network elements. The network element level results process 203 sends 213 a relevant portion of the produced data to filtering and correlation process 205 for further processing. A network topology process 204 sends 214 the network topology map to the filtering and correlation process 205, which adds further parameters to the data processed by the network element level results process 203. Such further parameters can include, for example, data on NE location, NE role, NE maintenance history and/or services impacted by a possible failure. The filtering and correlation process 205 send 215 the enriched data to an evaluation process 207. The evaluation process evaluates the data and determines which NEs need to be repaired. Then, on the evaluation process 207 send 218 respective instructions to a work orders process 208, which determines the actual list of necessary maintenance operations, estimates the maintenance break length, and obtains an alternative network topology map from the network topology process 204. The work orders process 208 also obtains a network traffic estimate from an OSS/BSS (Operation Support system/Business support system) and selects the actual maintenance time. Additionally, the work orders process 208, before the selected maintenance time, automatically send 219 configuration messages to the network elements 201 in order to configure the network elements into an alternative network configuration.

FIG. 2. also shows that the critical alarm prediction process 202 send 216 relevant data to a reports and network level aggregates process 206, which produces network level analyses on the operation of the network. The reports and network level aggregates process 206 send 217 its relevant analyses to the evaluation process 207. These analyses can also be taken into account in the evaluation in the evaluation process 207 and also in the actual plans produced by the work orders process 208.

According to an embodiment, the work orders process 208 can also create work orders for maintenance crew and take care of scheduling of their work. The work orders process 208 can also include necessary information in the work orders so that the maintenance crew knows how to fix the problem smoothly and quickly. If needed, the work orders process 208 can also instruct which spare parts need to be ordered.

According to an embodiment, the critical alarm prediction process 202 utilizes at least one of the algorithms discloses in Handbook of data mining and knowledge discovery, Pages 891-896, Oxford University Press, Inc. New York, N.Y., USA 2002, ISBN: 0-19-511831-6, discusses different methods for predicting telecommunication equipment failures from sequences of network alarms. According to another embodiment, the critical alarm prediction process 202 utilizes improved algorithms.

According to an embodiment, processes 202, 203, 205, 206, 207 and 208 are performed in PEM of FIG. 1.

Figure 3:
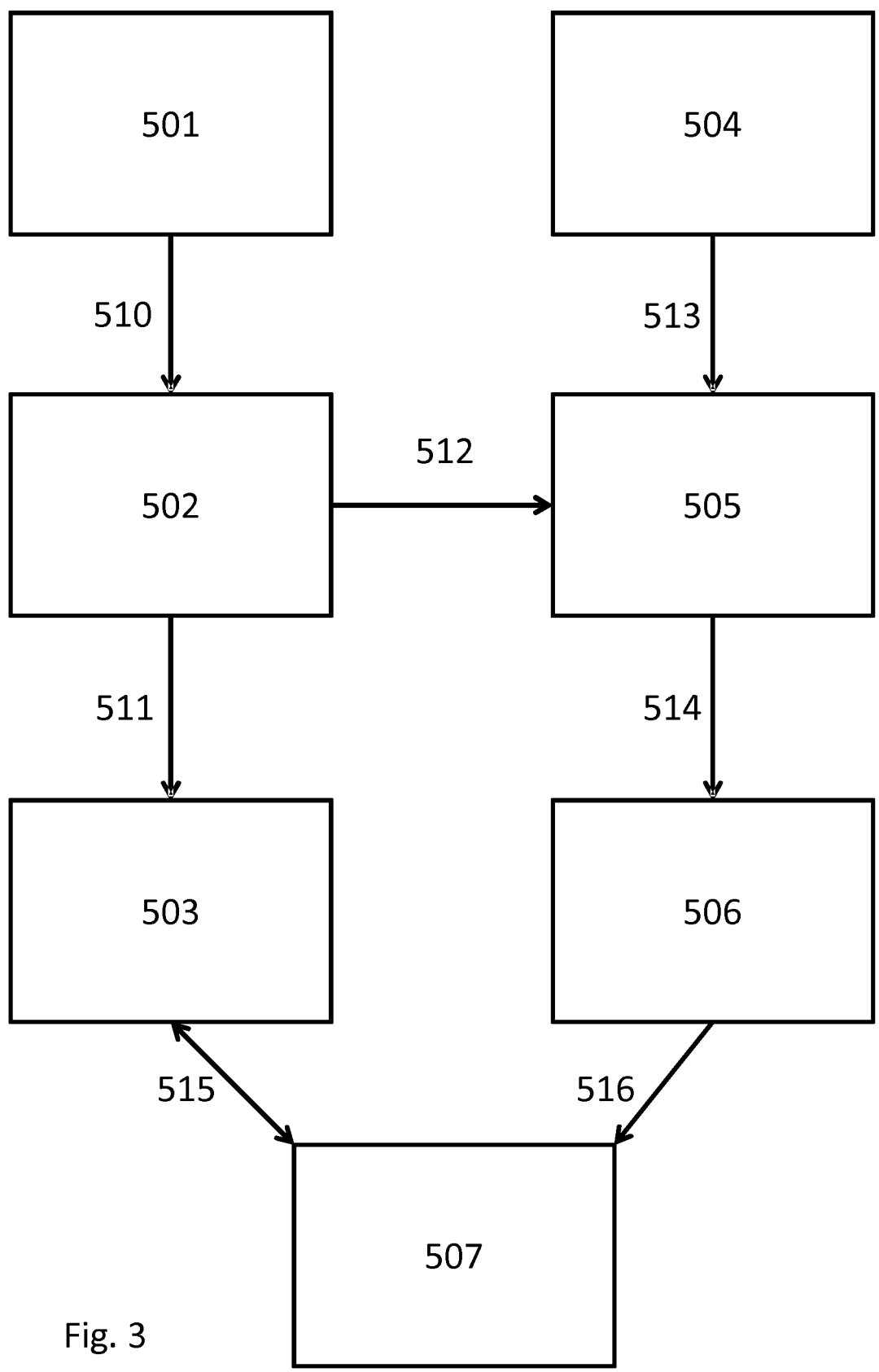
FIG. 3 presents a process flow according to an embodiment.

FIG. 3 shows a process according to an embodiment. FIG. 3 shows a current topology map (CTM) 501 and an estimated topology map (ETM) 504, which is an alternative topology map without the NE under maintenance. CTM is obtained from an inventory system. ETM is also obtained from an inventory system but it is processed to take into account the planned maintenance operations. In an embodiment, the NEs effected are just excised from the CTM. In another embodiment, the ETM is processed in the inventory system with the information on the affected NEs. In a further embodiment, this information is sent to the inventory system from the evaluation process 207 of FIG. 2. In an alternative embodiment, the evaluation process 207 will create the ETM.

In another embodiment, CTM 501 is obtained from the inventory system and sent to a first estimation process 502, which estimates a traffic pattern on top of the topology based on the estimation of probable traffic based on the prediction model of traffic. The first estimation process 502 produces 511 a first traffic estimate 503 in the CTM. The first traffic estimate 503 shows the flow of traffic in the network under CTM. This first traffic estimate 503 can form a benchmark for the ETM in some embodiments. ETM 504 is also obtained from the inventory system, which has determined it without the NE or NEs under maintenance. ETM is sent 513 to a second estimation process 505, which obtains 512 the first traffic estimate 503 from the first estimation process 502. The second estimation process 505 produces a second traffic estimate 506 in the network under ETM. Then, this second traffic estimate 506 is used to optimize the ETM such that the network can serve the traffic according to the second traffic estimate 506 also in the ETM. According to an embodiment, the further check can be made at this point to check how well the ETM can serve the estimated traffic when compared to the benchmark set by the CTM. If there remains a larger gap than a threshold, then a second alternative network topology map can be determined and checked as a potential ETM as previously described. This can be useful if there are more than one possible network topologies available without the affected NE or NEs.

After the second traffic estimate 506 and the ETM are ready, configuration instructions are sent 516 to NEs to get a set of NEs with new configuration 507 for the period of maintenance.

In an embodiment, comparisons 515 are made between a network optimization model for the first traffic estimate 503 and the current configuration and settings of NEs and if necessary, one or more reconfiguration orders are issued.

After the maintenance break is over, NEs can be reconfigured according to the network optimization model for the first traffic estimate 503 or according to the previous CTM.

In an embodiment, when an NE receives contradictory configuration messages from block 503 and block 506, it makes a query to the work orders process 208, Serving Gateway S-GW or another appropriate network management node as to the appropriate settings. At the same time, it can set a flag that the system can more thoroughly monitor the operation of the NE and the associated NEs in view of optimizing the network in future situations.

According to an embodiment, a method of enhancing quality of service of a telecommunication network comprises:

receiving technical data from a plurality of network elements (NEs) of the telecommunication network, which technical data includes alarm messages and optionally other data on the operation of the NEs and/or their operation environment;

processing the data received from the network elements to produce failure prediction metrics for each of the network elements;

identifying at least one network element with a high risk of failure based on the failure prediction metrics;

for each identified network element:

analysing the received data and preparing a prediction including a predicted type of failure, a predicted time of failure, a list of necessary maintenance operations to prevent the predicted failure and an estimated maintenance break length, which is an estimate of time required to perform the maintenance operations;

obtaining an up-to-date network topology map from a network service and resource inventory system, the up-to-date network topology map containing the identified network element;

determining an alternative network topology map without the identified network element;

preparing a network traffic estimate over a period of time longer than the estimated maintenance break length and occurring before the predicted time of failure;

using the prepared network traffic estimate to select a time for the maintenance operations such that the estimated network traffic is lower than average during the maintenance break;

determining an alternative network configuration for the alternative network topology map based on the network traffic estimate; and before the selected maintenance time, automatically configuring the network elements into the alternative network configuration.

The above embodiment can be performed in a system environment discussed above with reference to FIG. 1. According to a further embodiment, the processes described with reference to FIG. 2 and/or FIG. 3 are utilized.

In an embodiment, the telecommunication network is a cellular network and the network elements comprise a plurality of base stations each having a coverage area, within which it serves user equipment UEs, such as mobile terminal devices, for example mobile phones.

In an embodiment, the cellular network is network according to Code Division Multiple Access (CDMA) standard, wideband code division multiple access (WCDMA) standard, Long Term Evolution (LTE) standard, long term evolution advanced (LTE-A) standard and/or Global System for Mobile Communications (GSM) standard, including Universal Mobile Telecommunications System (UMTS) standard.

In an embodiment, the base stations include configurable base stations having automatically configurable coverage areas.

In an embodiment, the configurable base stations include bases stations having adjustable radio beams.

In an embodiment, the automatic configuration or reconfiguration of the network comprises instructing at least one cell to temporarily decrease its channel bandwidth.

In an embodiment, the automatic configuration or reconfiguration of the network comprises instructing temporarily decreasing channel bandwidth of at least one cell and adaptively increasing the coverage of the at least one cell in order to compensate a coverage hole caused in the network by the maintenance operations.

In an embodiment, the automatic configuration or reconfiguration of the network comprises commanding forced handovers between cells. This can be used to transfer the traffic of some of the UEs from a cell to another cell.

In an embodiment, the automatic configuration or reconfiguration of the network comprises instructing automated antenna tilting of an antenna serving a cell. This can be used to reshape a coverage area, for example such that a neighboring cell covers the area of the cell under maintenance.

In an embodiment, the automatic configuration or reconfiguration of the network comprises instructing automated transmission power adaptation in a cell.

In an embodiment, the automatic configuration or reconfiguration of the network comprises instructing flying repeaters to compensate a coverage hole caused in the network by the maintenance operations.

In an embodiment, the technical data includes event messages.

In an embodiment, the technical data from the plurality of network elements is received in PEM shown in FIG. 1. as is also shown in FIG. 2 by arrow 211 from NEs 201 to the processing 202 etc.

In an embodiment, the received data is processed for example in PEM to produce failure prediction metrics for each of the network elements. This can be performed by the critical alarm prediction process 202 and the network element level results process 203 of FIG. 2.

In an embodiment, at least one network element with a high risk of failure is identified by the evaluation process 207 of FIG. 2. This is made based on the failure prediction metrics provided by the processes 202, 203 and 205.

In an embodiment, the following steps are performed for each identified network element:

The evaluation process 207 of FIG. 2 analyses the received data and prepares the prediction including a predicted type of failure and the predicted time of failure.

The evaluation process 207 of FIG. 2 prepares the list of necessary maintenance operations and the estimated maintenance break length.

The evaluation process 207 of FIG. 2 obtains the up-to-date network topology map from the network service and resource inventory system. The up-to-date network topology map contains the identified network element and is also called as CTM in the embodiment of FIG. 3.

The evaluation process 207 of FIG. 2 determines or instructs the network service and resource inventory system to determine an alternative network topology map without the identified network element. This alternative network topology map is also called as ETM in the embodiment of FIG. 3.

The evaluation process 207 prepares a network traffic estimate over a period of time longer than the estimated maintenance break length and occurring before the predicted time of failure.

The evaluation process 207 of FIG. 2 uses the prepared network traffic estimate to select a time for the maintenance operations. The time is selected such that the estimated network traffic is lower than average during the maintenance break and thus the impact of the maintenance is lower. In an embodiment, the selection process can also find a minimum estimated traffic time and select it as the maintenance time. If the maintenance operations include also steps that require human operator's involvement, the selection process can take into account the availability of such resources. In case several NEs need repair, the selection process can also coordinate the maintenance breaks such that the repairs are made in an appropriate order. This can also prevent that the NEs that are needed to compensate each other's outage are not repaired at the same time but in sequence.

An alternative network configuration for the alternative network topology map is determined based on the network traffic estimate in the evaluation process 207.

Before the selected maintenance time, the work orders process 208 of FIG. 2 automatically configures or reconfigures the network elements into the alternative network configuration. In an embodiment, this is done by PEM of FIG. 1 and is depicted by arrow 516 in FIG. 3.

In an embodiment, the network topology process 204 of FIG. 2 can be performed in the inventory system described with reference to FIG. 3. In the specification and claims, the inventory system is also called as the network service and resource inventory system.

According to an embodiment, there is provided a computer program product configured to cause a computer system connected to, or forming part of, a telecommunication network to perform any one of the methods described above.

According to an embodiment, there is provided a computer system for a telecommunication network, wherein the system comprises means adapted to perform any one of the methods described above.

According to an embodiment, the cellular radio access network is adapted to perform any one of the methods described above.

The above description is only to exemplify the invention and is not intended to limit the scope of protection offered by the claims. The claims are also intended to cover the equivalents thereof and not to be construed literally.

The invention claimed is:

1. A method of enhancing quality of service of a telecommunication network, the method comprising:
receiving technical data from a plurality of network elements of the telecommunication network, the technical data including alarm messages;
processing the data received from the network elements to produce failure prediction metrics for each of the network elements;
identifying at least one network element with a high risk of failure based on the failure prediction metrics;
for each identified network element:
analysing the received data and preparing a prediction including a predicted type of failure, a predicted time of failure, a list of necessary maintenance operations to prevent the predicted failure and an estimated maintenance break length, which is an estimate of time required to perform the maintenance operations;
obtaining an up-to-date network topology map from a network service and resource inventory system, the up-to-date network topology map containing the identified network element:

determining an alternative network topology map without the identified network element;

preparing a network traffic estimate over a period of time longer than the estimated maintenance break length and occurring before the predicted time of failure;

using the prepared network traffic estimate to select a time for the maintenance operations such that the estimated network traffic is lower than average during the maintenance break;

determining an alternative network configuration for the alternative network topology map based on the network traffic estimate and correlated to the failure prediction metrics, in which the impact of the maintenance operations in the alternative network configuration is less than in the current network configuration; and before the selected maintenance time, automatically configuring the network elements into the alternative network configuration.

2. The method of claim 1, wherein the telecommunication network is a cellular network and the network elements comprise a plurality of base stations each having a coverage area.

3. The method of claim 2, wherein the cellular network is a network according to Code Division Multiple Access (CDMA) standard, wideband code division multiple access (WCDMA) standard, Long Term Evolution (LTE) standard, long term evolution advanced (LTE-A) standard and/or Global System for Mobile Communications (GSM) standard, including Universal Mobile Telecommunications System (UMTS) standard.

4. The method of claim 2, wherein the base stations include configurable base stations having automatically configurable coverage areas.

5. The method of claim 4, wherein the configurable base stations include base stations having adjustable radio beams.

6. The method of claim 1, wherein the automatically configuring the network comprises instructing temporarily decreasing channel bandwidth of at least one cell.

7. The method of claim 1, wherein the automatically configuring the network comprises instructing temporarily decreasing channel bandwidth of at least one cell and adaptively increasing the coverage of the at least one cell in order to compensate a coverage hole caused in the network by the maintenance operations.

8. The method of claim 1, wherein the automatically configuring the network comprises commanding forced handovers between cells.

9. The method of claim 1, wherein the automatically configuring the network comprises instructing automated antenna tilting of an antenna serving a cell.

10. The method of claim 1, wherein the automatically configuring the network comprises instructing automated transmission power adaptation in a cell.

11. The method of claim 1, wherein the automatically configuring the network comprises instructing flying repeaters to compensate a coverage hole caused in the network by the maintenance operations.

12. The method of claim 1, wherein the technical data includes event messages.

13. A processor configured to cause a computer system connected to, or forming part of, a telecommunication network to perform a method according to claim 1.

14. A processor for a telecommunication network, wherein the processor comprises adapter to perform a method according to claim 1.

15. A cellular radio access network, comprising:
a receiver configured to receive technical data from a plurality of network elements of the telecommunication network, the technical data including alarm messages;
a processor to process the data received from the network elements to produce failure prediction metrics for each of the network elements and to identify at least one network element with a high risk of failure based on the failure prediction metrics;
for each identified network element, the processor further configured to:
analyse the received data and prepare a prediction including a predicted type of failure, a predicted time of failure, a list of necessary maintenance operations to prevent the predicted failure and an estimated maintenance break length, which is an estimate of time required to perform the maintenance operations;
obtain an up-to-date network topology map from a network service and resource inventory system, the up-to-date network topology map containing the identified network element;
determine an alternative network topology map without the identified network element;
prepare a network traffic estimate over a period of time longer than the estimated maintenance break length and occur before the predicted time of failure;
use the prepared network traffic estimate to select a time for the maintenance operations such that the estimated network traffic is lower than average during the maintenance break;
determine an alternative network configuration for the alternative network topology map based on the network traffic estimate and correlated to the failure prediction metrics, in which the impact of the maintenance operations in the alternative network configuration is less than in the current network configuration; and
before the selected maintenance time, automatically configure the network elements into the alternative network configuration.

* * * * *